United States Patent
Yi et al.

(10) Patent No.: US 8,165,097 B2
(45) Date of Patent: Apr. 24, 2012

(54) TRANSMISSION METHOD OF MOBILE STATION FOR RANDOM ACCESS CHANNEL DIVERSITY

(75) Inventors: Hyo-Seok Yi, Daejeon (KR); Il-Gyu Kim, Seoul (KR); Young-Jo Ko, Daejeon (KR); Kapseok Chang, Daejeon (KR); Hyeong-Geun Park, Daejeon (KR); Young-Hoon Kim, Daejeon (KR); Seung-Chan Bang, Daejeon (KR)

(73) Assignee: Electronics and Telecommincations Research Institute, Daejeon (KR)

( * ) Notice: Subject to any disclaimer, the term of this patent is extended or adjusted under 35 U.S.C. 154(b) by 60 days.

(21) Appl. No.: 12/297,745

(22) PCT Filed: Apr. 19, 2007

(86) PCT No.: PCT/KR2007/001905
§ 371 (c)(1),
(2), (4) Date: Oct. 20, 2008

(87) PCT Pub. No.: WO2007/120019
PCT Pub. Date: Oct. 25, 2007

(65) Prior Publication Data
US 2009/0175161 A1  Jul. 9, 2009

(30) Foreign Application Priority Data

Apr. 19, 2006 (KR) ............... 10-2006-0035325
Apr. 19, 2007 (KR) ............... 10-2007-0038148

(51) Int. Cl.
*H04W 4/20* (2009.01)
(52) U.S. Cl. .................... 370/334; 370/252
(58) Field of Classification Search .......... 370/210, 370/331, 343; 375/267
See application file for complete search history.

(56) References Cited

U.S. PATENT DOCUMENTS

| | | | | |
|---|---|---|---|---|
| 5,960,353 | A * | 9/1999 | Lee | 455/453 |
| 6,788,940 | B2 * | 9/2004 | Bhatoolaul et al. | 455/442 |
| 6,937,641 | B2 * | 8/2005 | Li et al. | 375/141 |
| 6,961,545 | B2 | 11/2005 | Tehrani et al. | |

(Continued)

FOREIGN PATENT DOCUMENTS

KR  10-2001-0080168  8/2001

(Continued)

OTHER PUBLICATIONS

International Search Report, Application No. PCT/KR2007/001905, Dated Jul. 20, 2007.

(Continued)

*Primary Examiner* — Ricky Ngo
*Assistant Examiner* — Ben Liu
(74) *Attorney, Agent, or Firm* — Kile Park Goekjian Reed & McManus PLLC

(57) ABSTRACT

A transmission method performed by a mobile station for random access channel (RACH) burst transmission diversity gain is provided. According to the method, by combining and using switching diversity by beam forming, frequency hopping, and power ramping, the probability that when the speed of a mobile station is low, the mobile station falls into a deep fading environment is lowered, thereby increasing the probability of detecting an RACH signature of the base station. Also, by using the transmission parameters (subbands, precoding matrixes, power, etc.) which are used for successful transmission of an RACH burst, for transmission of a successive user packet data, reliable transmission of the successive user packet data can be performed.

12 Claims, 7 Drawing Sheets

U.S. PATENT DOCUMENTS

| | | |
|---|---|---|
| 7,103,027 B2 * | 9/2006 | Dick et al. .................... 370/335 |
| 7,289,826 B1 * | 10/2007 | Hovers et al. .............. 455/562.1 |
| 7,492,743 B2 * | 2/2009 | Uhlik ........................... 370/337 |
| 7,551,546 B2 * | 6/2009 | Ma et al. ...................... 370/208 |
| 2002/0061005 A1 | 5/2002 | Lee et al. |
| 2005/0232158 A1 * | 10/2005 | Hondo .......................... 370/241 |
| 2006/0262874 A1 * | 11/2006 | Shan ............................. 375/267 |
| 2007/0047493 A1 * | 3/2007 | Park et al. .................... 370/331 |
| 2007/0064665 A1 * | 3/2007 | Zhang et al. ................. 370/343 |
| 2007/0263579 A1 * | 11/2007 | Ozluturk ...................... 370/338 |
| 2008/0279257 A1 * | 11/2008 | Vujcic et al. ................. 375/132 |
| 2008/0316913 A1 * | 12/2008 | Kim et al. .................... 370/210 |

FOREIGN PATENT DOCUMENTS

| | | |
|---|---|---|
| KR | 10-2005-0048659 | 5/2005 |
| WO | 00/21320 | 4/2000 |
| WO | 2004/038951 | 5/2004 |

OTHER PUBLICATIONS

Michel T. Ivrlac, et al., "On Time-Switched space-Time Transmit Diversity in MISO Systems", Institute for Circuit Theory and Signal Processing Munich University of Technology, pp. 710-714, Date 2002.

Written Opinion PCT/KR2007/001905, Dated Jul. 20, 2007.

\* cited by examiner

TRANSMISSION METHOD OF MOBILE STATION FOR RANDOM ACCESS CHANNEL DIVERSITY

TECHNICAL FIELD

The present invention relates to a transmission method of a mobile station, and more particularly, to a transmission method of obtaining random access transmission diversity gain when a mobile station transmits a random access channel (RACH) burst and a successive user packet data to a base station in a cellular system based on orthogonal frequency division multiple access (OFDMA).

BACKGROUND ART

Currently, in regard to wireless transmission technologies for long term evolution (LTE), a third generation partnership project (3GGP) uses an orthogonal frequency division multiple access (OFDMA) modulation method for a downlink transmission method, and considers a discrete Fourier transform-spread (DFT-S) OFDMA method as a candidate technology for an uplink transmission method.

Also, in order to introduce a multi input multi output (MIMO) technology into a forward link, a base station and a mobile station are considered to each essentially use two or more antennas.

In addition, a transmission technology using frequency hopping with a concept of a subband, by dividing predetermined resources when transmission is performed through a random access channel (RACH), is also considered.

Meanwhile, in a cellular system that is a fading channel environment, a base station should detect an RACH burst transmitted by a mobile station when the mobile station attempts random access, and the mobile station should transmit a successive user packet data with a higher reliability. Accordingly, a transmission method by a mobile station by which in a fading channel environment, the probability of detection by a base station of an RACH burst can be increased, and reliable transmission of the successive user packet data can be performed, is necessary.

DETAILED DESCRIPTION OF THE INVENTION

Technical Problem

The present invention provides a transmission method of a mobile station having a multi transmission antenna capable of increasing the probability of detection by a base station of a random access channel (RACH) burst, and performing a successive user packet data transmission that is robust against a fading environment.

The objectives, characteristics, and merits will now be described more clearly with embodiments of the present invention with reference to the accompanying drawings, and accordingly, a person of ordinary skill in the art of the present invention will be able to use the technical idea of the present invention more easily.

Also, it can be easily understood that the objectives and merits can be implemented by using means and combinations of the means in the claims.

Technical Solution

According to an aspect of the present invention, there is provided a transmission method performed by a mobile station of obtaining random access diversity gain, the method including: (a) processing the signal of a random access channel (RACH) burst according to a beam forming pattern set from among a plurality of beam forming patterns, and then, transmitting the RACH burst to a base station through multiple transmission antennas; and (b) if a non-acknowledgement (NACK) response to the RACH burst from the base station is received, newly setting a beam forming pattern which is different from the set beam forming pattern, to a new RACH burst, and then, returning to step (a).

The RACH burst may be transmitted by using a subband that is different from a subband allocated to the previous RACH burst.

The method may further include, if a NACK from the base station is received while a predetermined time has elapsed, newly setting a transmission power higher than an previously set transmission power and returning to step (a).

The method may further include, if an acknowledgement response (ACK) from the base station is received, transmitting a user packet data, by using the beam forming patterns set when the RACH burst, of which the ACK is received, is transmitted.

A successive user packet data may be transmitted by using a subband in which the RACH burst, of which the ACK is received, is transmitted.

The transmission power of the successive user packet data may be set based on the power used for the transmission of the RACH burst, of which the ACK is received.

According to another aspect of the present invention, there is provided a computer readable recording medium having embodied thereon a computer program for executing a transmission method by a mobile station of obtaining random access diversity gain.

ADVANTAGEOUS EFFECTS

If a mobile station uses switching diversity by beam forming according to the present invention, the probability that when the speed of the mobile station is low, the mobile station falls into a deep fading environment is lowered and an additional gain by the beam forming is obtained. Accordingly, the probability of detecting a random access channel (RACH) signature of the base station is increased, detection of an RACH is enabled with a lower transmission power compared to when the switching diversity is not applied, and therefore the cell coverage of an uplink is increased.

Also, according to the present invention, by using the transmission parameters (subbands, preceding matrixes, power, etc.) which are used for successful transmission of an RACH burst, for transmission of user packet data, reliable transmission of the successive user packet data to the base station can be performed.

BEST MODE

Mode of the Invention

Figure 1:
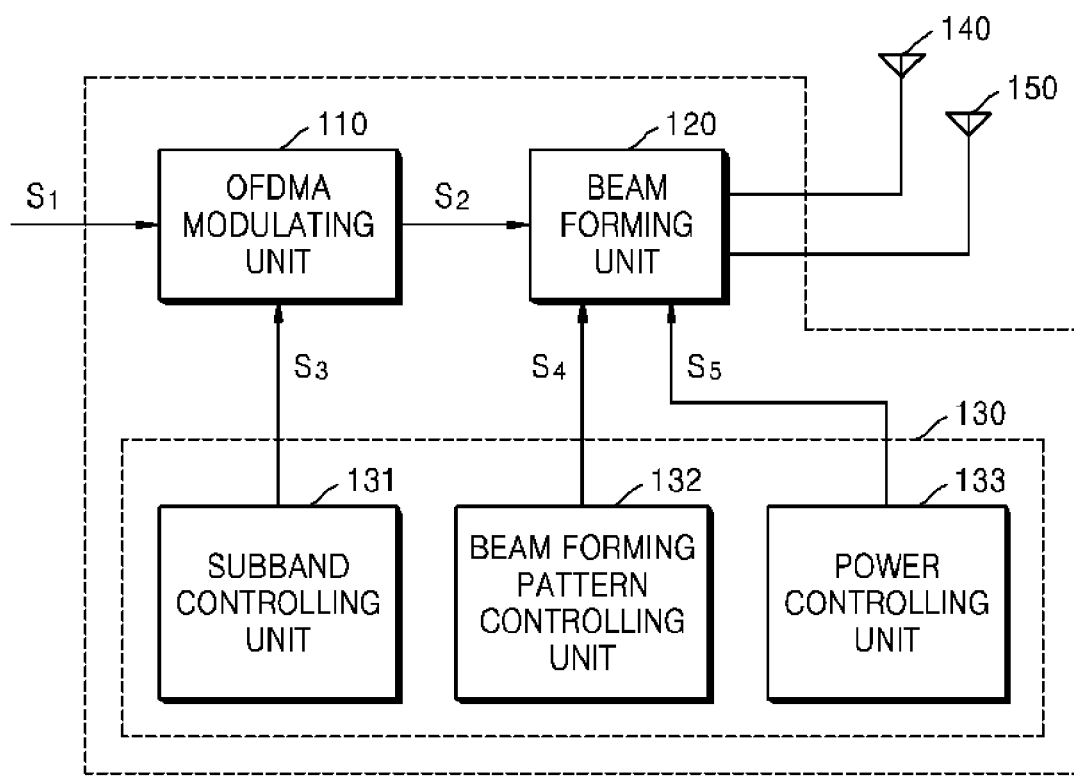
FIG. 1 is a block diagram illustrating an internal structure of a transmission apparatus of a mobile station obtaining transmission diversity gain of a random access channel (RACH) burst, by using beam forming and frequency hopping, according to an embodiment of the present invention.

The present invention will now be described more fully with reference to the accompanying drawings, in which exemplary embodiments of the invention are shown. Like reference numerals in the drawings denote like elements, and thus their description will be omitted. Also, in the explanation of the present invention, if it is determined that a detailed explanation of a conventional technology related to the present invention may confuse the scope of the present invention, the description will be omitted.

Also, when a part is described to "include" an element, it does not mean that other elements are excluded, but it means that the part may further include other elements, unless otherwise described.

The present invention relates to a transmission method of a mobile station to obtain diversity gain when a random access channel (RACH) burst is transmitted.

The RACH burst includes a signature sequence of a frequency (or time) domain which a base station uses in order to identify a mobile station attempting random access, and may include information on at least one of user identification and a resource request for setting up a call. The RACH burst may be used as a response to a base station that is paging or may also be used when a mobile station attempts to call the base station.

After demodulating a received RACH burst signal, the base station transmits an acknowledgement signal (ACK) or a non-acknowledgement signal (NACK) as a response to the received signal, to the mobile station.

When the base station demodulates the RACH burst signal and transmits the response, a bit which is used to adjust transmission timing of a mobile station is transmitted through a downlink so that when traffic data of each mobile station is transmitted, the data can be received within a cyclic prefix (CP).

For convenience of explanation, in the present invention, an example of a mobile station which uses a discrete Fourier transform-spread (DFT-S) orthogonal frequency division multiple access (OFDMA) modulation method as an OFDMA modulation method will be described. However, it can be clearly understood by a person of ordinary skill in the art of the present invention that the present invention can be also applied to a mobile station using an ordinary OFDMA modulation method.

Also, although a mobile station having two transmission antennas is described in the present invention for convenience of explanation, it can be clearly understood by a person of ordinary skill in the art of the present invention that the present invention can be applied to a mobile station having three or more multiple transmission antennas.

FIG. 1 is a block diagram illustrating an internal structure of a transmission apparatus of a mobile station obtaining transmission diversity gain of an RACH burst, by using beam forming, frequency hopping, and power ramping according to an embodiment of the present invention.

Referring to FIG. 1, the transmission apparatus having two transmission antennas 140 and 150 includes an OFDMA modulating unit 110, a beam forming unit 120, and a controlling unit 130.

The OFDMA modulating unit 110 allocates a predetermined subband to an RACH burst ($S_1$), and OFDMA-modulates the burst($S_1$), thereby generating an RACH burst signal ($S_2$) which is a modulated signal. The OFDMA modulating unit 110 modulates a successive user packet data, including an RACH message, and transmits the modulated signal to the beam forming unit 120, if the transmission apparatus receives an ACK response of the RACH burst from a base station. In this case, a successive user packet data is allocated the subband allocated to the RACH burst of which the ACK is received.

The beam forming unit 120 processes preceding of the RACH burst signal ($S_2$), which is the output of the OFDMA modulating unit 110, according to a predetermined beam forming pattern, thereby generating a beam and transmitting the beam to multiple transmission antennas. Also, if the ACK of the RACH burst from the base station is received, the beam forming unit 120 performs precoding of the OFDMA-modulated successive user packet data received from the OFDMA modulating unit 110, thereby generating a beam and transmitting the beam to the base station. In this case, the successive user packet data is precoded according to the beam forming pattern which is applied to the RACH burst of which the ACK is received.

The controlling unit 130 includes a subband controlling unit 131, a beam forming pattern controlling unit 132, and a power controlling unit 133. The subband controlling unit 131 generates a control signal ($S_3$) for controlling a subband allocated to the RACH burst ($S_1$), and the beam forming pattern controlling unit 132 generates a control signal ($S_4$) for controlling a beam forming pattern of the RACH burst signal ($S_2$). The power controlling unit 133 generates a control signal ($S_5$) for controlling the transmission power of the RACH burst signal ($S_2$). Until an ACK of an RACH burst from the base station is received, whenever an RACH burst is transmitted, the controlling unit 130 resets at least one of a plurality of subbands and beam forming patterns. In this case, even after at least one of the subbands and beam forming patterns is reset and an RACH burst is repeatedly transmitted, if an ACK is not received during a predetermined period, a transmission power that is a predetermined margin higher than the previously set transmission power is reset, and then at least one of the subbands and beam forming patterns on an RACH burst is reset, and the RACH burst is repeatedly transmitted. Also, if the ACK is received, the controlling unit 130 allocates the subband allocated to the RACH burst of which the ACK is received, to the successive user packet data, and precodes the OFDMA-modulated successive user packet data with the beam forming pattern which is applied to the RACH burst of which the ACK is received. Also, the controlling unit 130 controls so that the successive user packet data can be transmitted with a transmission power which is calculated based on the transmission power set to the RACH burst of which the ACK is received. Accordingly, the transmission power of the data may be equal to or different from the power set to the RACH burst of which the ACK is received. A method of calculating the transmission power will be explained later.

Figure 2:
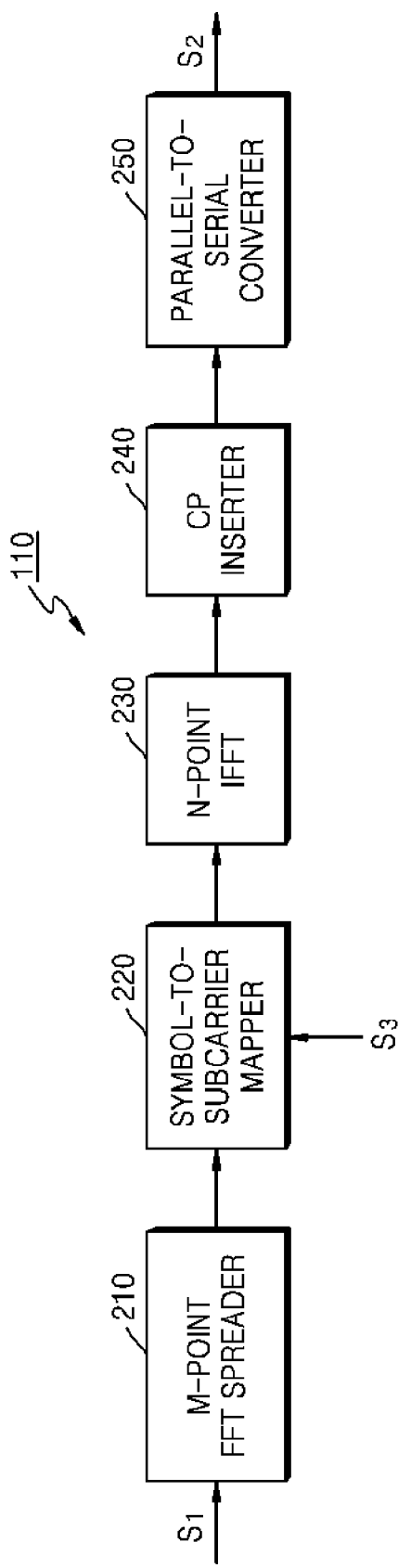
FIG. 2 is a block diagram illustrating an internal structure of an orthogonal frequency division multiple access (OFDMA) modulating unit of the transmission apparatus illustrated in FIG. 1 according to an embodiment of the present invention.

FIG. 2 is a block diagram illustrating an internal structure of an OFDMA modulating unit 110 of the transmission apparatus illustrated in FIG. 1 according to an embodiment of the present invention.

Referring to FIG. 2, the OFDMA modulating unit 110 includes an M-point fast Fourier transform (FFT) spreader 210, a symbol-to-subcarrier mapper 220, an N-point inverse fast Fourier transform (IFFT) unit 230, a CP inserter 240, and a parallel-to-serial converter 250.

The M-point FFT spreader 210 performs FFT transformation of M input symbols formed with complex number values on a signal constellation diagram, i.e., the RACH burst ($S_1$).

The symbol-to-subcarrier mapper 220 maps the M symbols output from the M-point FFT spreader 210 onto subcarriers of subband corresponding to the symbols, according to the subband control signal ($S_3$) of the controlling unit 130.

The N-point IFFT unit 230 performs N-point IFFT transformation of the complex number values mapped onto N subcarriers. The CP inserter 240 inserts a CP into the output of the N-point IFFT unit 230. The parallel-to-serial converter 250 converts the output of the CP inserter 240 input in parallel into a serial signal.

Figure 3:
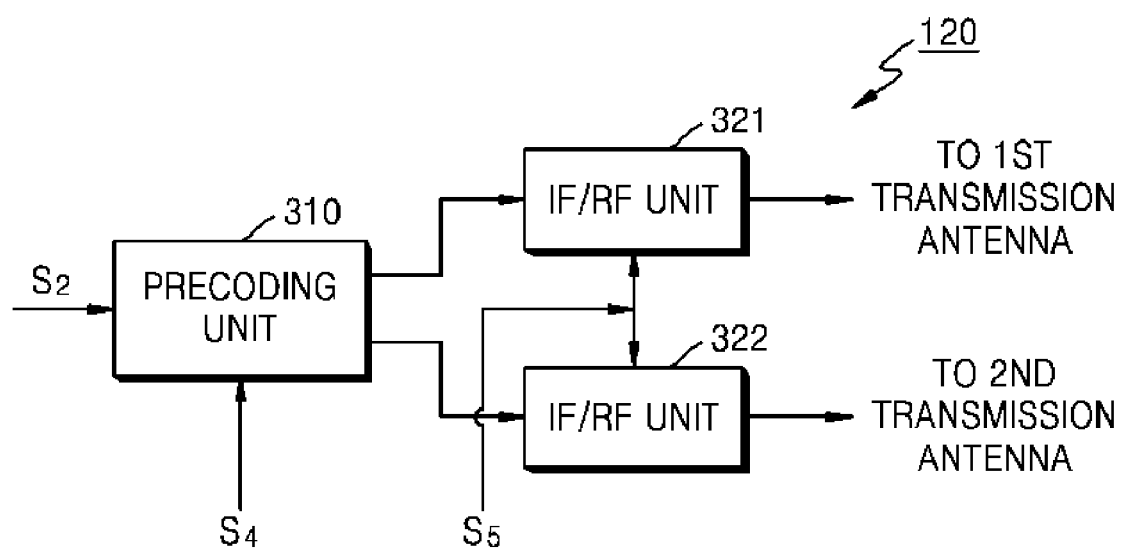
FIG. 3 is a block diagram illustrating an internal structure of a beam forming unit of the transmission apparatus illustrated in FIG. 1 according to an embodiment of the present invention.

FIG. 3 is a block diagram illustrating an internal structure of the beam forming unit 120 of the transmission apparatus illustrated in FIG. 1 according to an embodiment of the present invention.

Referring to FIG. 3, the beam forming unit 120 includes a preceding unit 310 and Intermediate Frequency/Radio Frequency (IF/RF) units 321 and 322.

According to the beam forming pattern control signal ($S_4$) of the controlling unit 130, the precoding unit 310 multiplies the RACH burst signal ($S_2$) by a column vector component value from among a plurality of column vectors of one precoding matrix which is selected from among one or more predefined preceding matrixes, thereby generating a precoded signal component for the first transmission antenna 140 and a precoded signal component for the second transmission antenna 150. The precoded signal components are transmitted to the IF/RF units 321 and 322, respectively, corresponding to the first transmission antenna 140 and the second transmission antenna 150, respectively.

The IF/RF units 321 and 322 amplify and up-convert the precoded signal components, respectively, to a predetermined power according to the power control signal ($S_5$), and transmit the signal components to the first and second transmission antennas, respectively, thereby generating beams.

Figure 4:
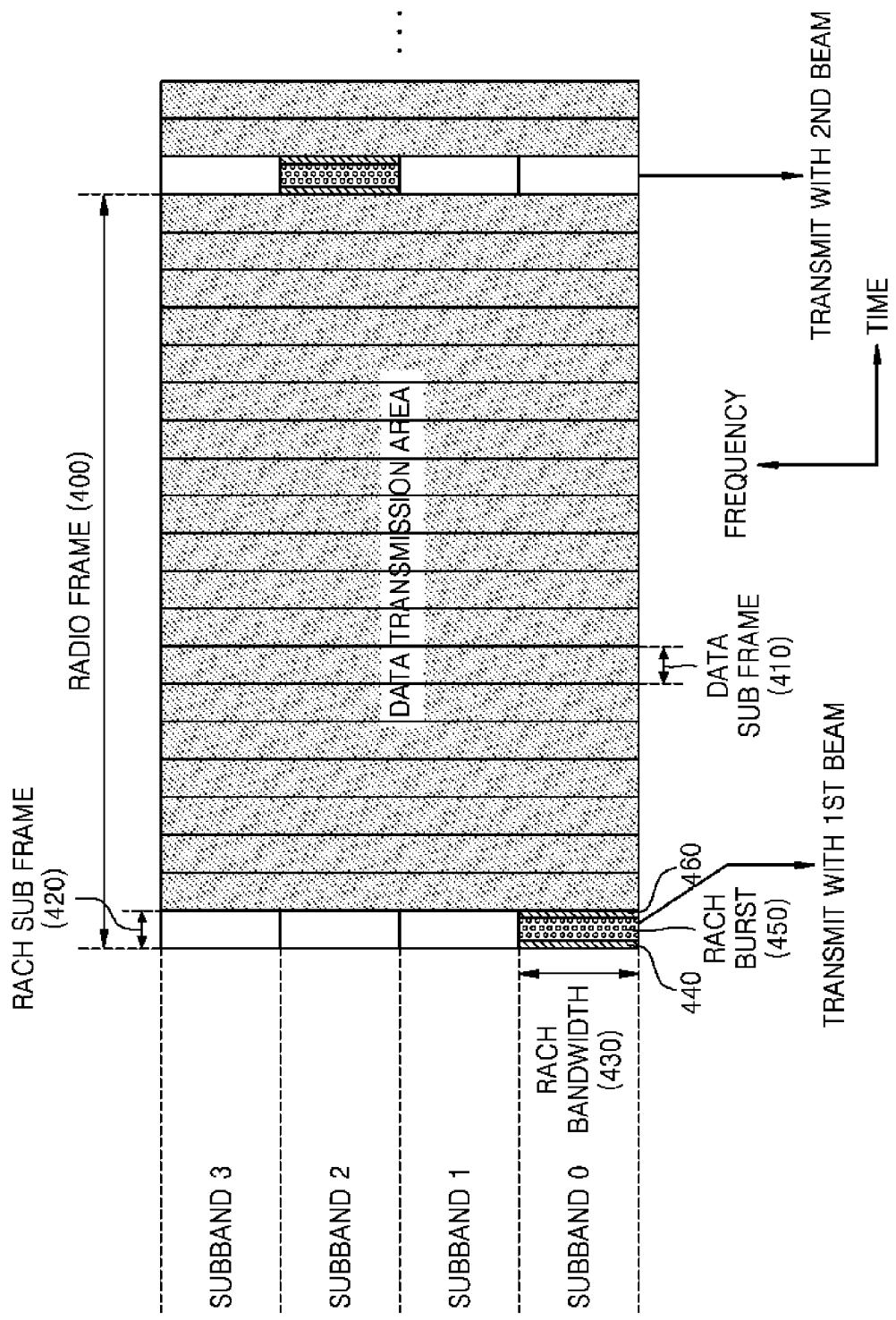
FIG. 4 is a diagram illustrating a structure of a third generation (3G) long term evolution (LTE) uplink frame using a discrete Fourier transform-spread (DFT-S) OFDMA method according to an embodiment of the present invention.

FIG. 4 is a diagram illustrating a structure of a third generation (3G) long term evolution (LTE) uplink frame using a discrete Fourier transform-spread (DFT-S) OFDMA method according to an embodiment of the present invention.

Referring to FIG. 4, one radio frame 400 is formed with an RACH transmission area for transmitting an RACH burst and a data transmission area for transmitting successive user packet data. The data transmission area is composed of a plurality of data sub frames 410 and the RACH transmission area is composed of one or more RACH sub frames 420. The RACH sub frame 420 is divided into a plurality of subbands, each of which has an RACH bandwidth 430. FIG. 4 illustrates four subbands expressed as subband 0, subband 1, subband 2, and subband 3. When an RACH burst signal is transmitted, a mobile station uses only one subband in one RACH sub frame.

An RACH burst signal includes guard times 440 and 460 and an RACH burst 450 on the time domain. Accordingly, in the present invention, an RACH burst and an RACH burst signal can be used interchangeably.

In general, in the 3G LTE, the length of one sub frame is 0.5 msec and the length of a radio frame is 10 msec. FIG. 4 illustrates an example in which only one RACH sub frame exists in a 10-msec radio frame.

The mobile station transmits an RACH burst signal (transmits as a first beam) in one subband in an RACH sub frame, by using an arbitrary RACH signature defined in a current cell, and receives an acquisition indication (AI) of the signal from a base station. If the AI is a NACK, the mobile station again transmits the RACH burst signal (transmits as a second beam), by using an arbitrary RACH signature in another subband in a next RACH sub frame. This process is repeatedly performed until an ACK from the base station is received.

Figure 5:
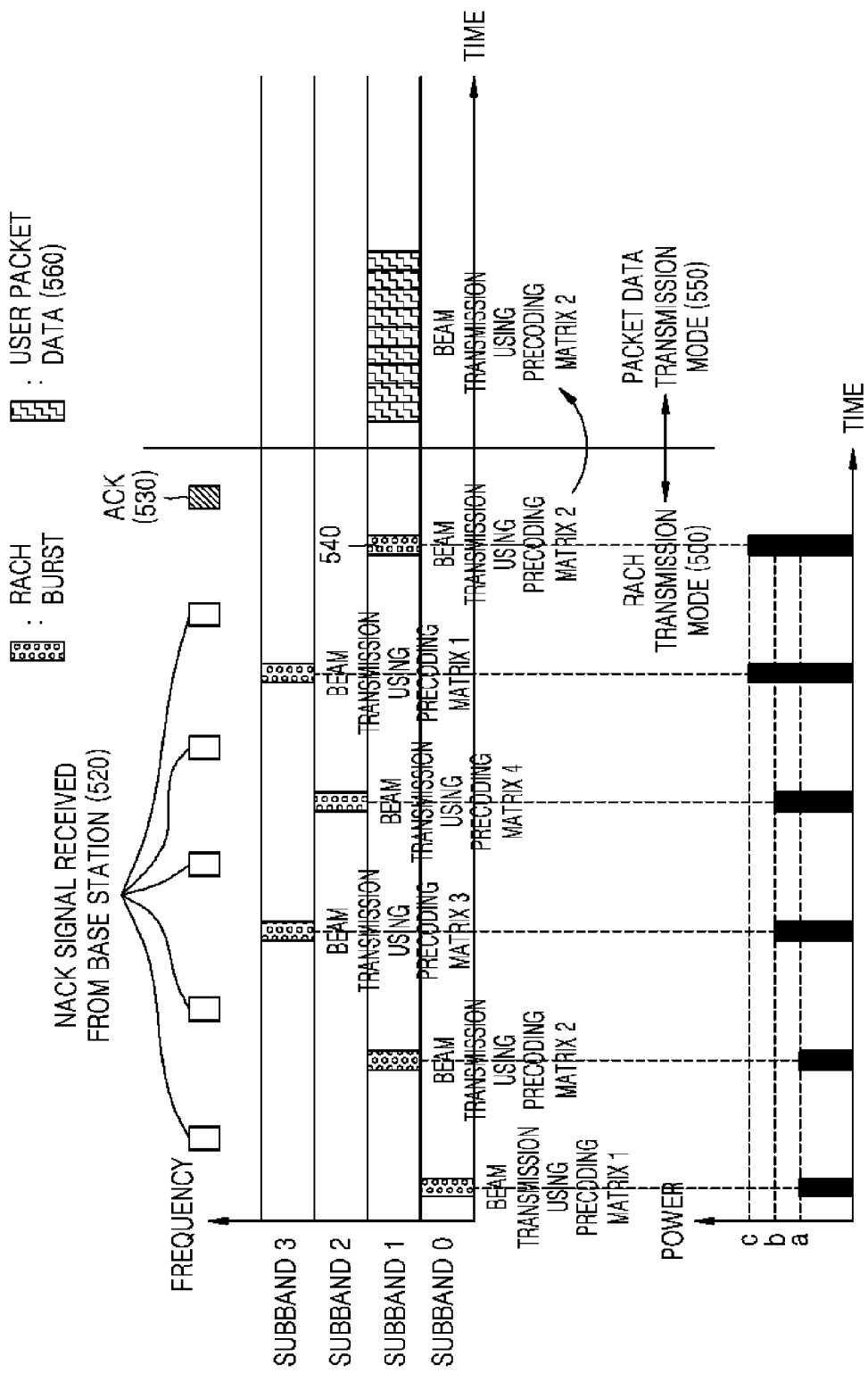
FIG. 5 is a diagram illustrating an example of a method of obtaining transmission diversity gain of an RACH burst by using the transmission apparatus illustrated in FIG. 1 according to an embodiment of the present invention.

FIG. 5 is a diagram illustrating an example of a method of obtaining transmission diversity gain of an RACH burst by using the transmission apparatus illustrated in FIG. 1 according to an embodiment of the present invention.

In the current embodiment, four subbands (subband 0 through subband 3) and four beam forming patterns (preceding matrix 1 through precoding matrix 4) are applied. For the current embodiment, the 3G LTE uplink frame structure using the DFT-S OFDMA method illustrated in FIG. 4 can be referred to. A preceding matrix N indicates one column vector from among a plurality of column vectors of one preceding matrix which is selected from among predefined one or more preceding matrixes according to a beam forming pattern control signal.

Referring to FIG. 5, in an RACH transmission mode 500, a mobile station transmits an RACH burst in a subband 0 of a first radio frame with a transmission power of level (a), by using a beam formed by processing the signal with a preceding matrix 1. If a NACK from a base station is received, the mobile station transmits the RACH burst signal in a subband 1 of a second radio frame also with the same transmission power of level (a), by using a beam formed by processing the signal with a preceding matrix 2. This process is repeatedly performed, by changing at least one of the subband and the beam forming pattern, until an ACK from the base station is received within a predetermined period.

If the ACK from the base station is not received during the predetermined period, the mobile station raises the transmission power to a level (b, c) that is a predetermined margin higher than the level (a) of the previous transmission power, and transmits the RACH burst, by changing at least one of the subband and the beam forming pattern. The predetermined period may be set differently according to a design type.

In the embodiment of FIG. 5, if the mobile station transmits the RACH burst signal in a subband 1 of a sixth radio frame with the transmission power of level (c), by using a beam 540 formed by processing the signal with a precoding matrix 2, the mobile station receives the ACK signal 530 from the base station, and the transmission mode is changed from the RACH transmission mode 510 to a packet data transmission mode 550. In this case, the mobile station allocates the subband (subband 1) allocated to the RACH burst 540 which is transmitted for the last time, to a successive user packet data, including an RACH message, and performs OFDMA modulation of the successive user packet data. Then, by using a beam formed according to the beam forming pattern (preceding matrix 2) used for the transmission of the RACH burst, the mobile station transmits the successive user packet data.

The transmission power set to the successive user packet data is calculated based on the transmission power set to the RACH burst of which the ACK is received. Accordingly, the transmission power of the data may be equal to or different from the power set to the RACH burst of which the ACK is received. Since it is highly probable that the channel characteristic of the channel for transmitting the RACH burst, of which the ACK from the base station is received, is the best from among the channel characteristics of virtual channels generated by different preceding matrices, when packet data is transmitted after the RACH transmission mode is finished, transmitting the successive user packet data through the channel using the preceding matrix through which the RACH burst is transmitted for the last time can increase the probability of burst detecting of a demodulator in the base station.

Figure 6:
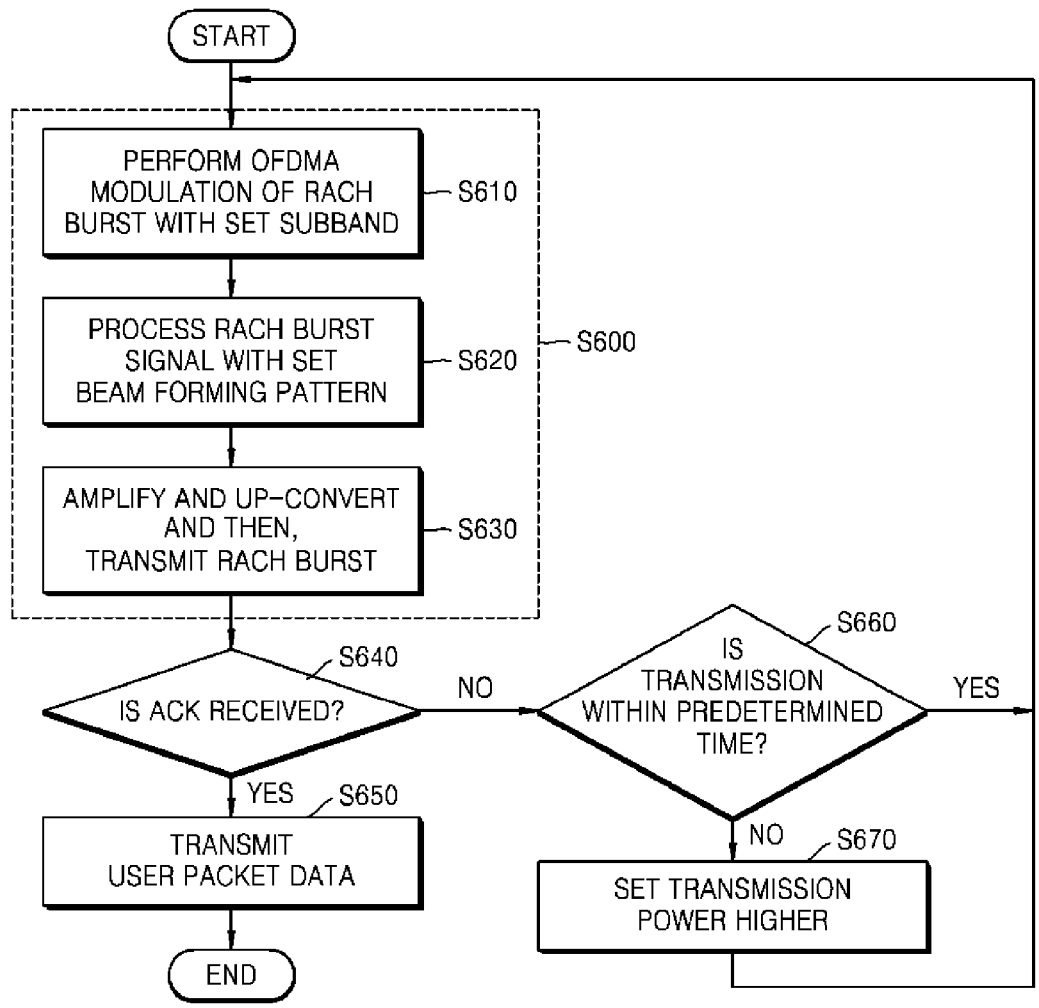
FIG. 6 is a flowchart explaining a method of obtaining transmission diversity gain of an RACH burst by using the transmission apparatus illustrated in FIG. 1 according to an embodiment of the present invention.

FIG. 6 is a flowchart explaining a method of obtaining transmission diversity gain of an RACH burst by using the transmission apparatus illustrated in FIG. 1 according to an embodiment of the present invention.

Referring to FIG. 6, first, an RACH burst is signal-processed according to a preset beam forming pattern, and then, a beam is generated and transmitted to a base station in operation S600.

More specifically, first, the RACH burst is OFDMA-modulated so that the RACH burst can be loaded on a preset subband among a plurality of subbands that can be allocated to the RACH burst. By doing so, an RACH burst signal is generated in operation S610.

A pattern selected from among a plurality of preset beam forming patterns is set to the RACH burst signal and according to the set beam forming pattern, the signal is processed in operation S620. Here, the signal processing means performing of precoding in order to form a virtual channel, and by applying a preceding matrix to the RACH burst signal, a signal having components corresponding to multiple transmission antennas, respectively, is generated.

The precoded RACH burst signal components are amplified and up-converted to a predetermined transmission power, and transmitted to corresponding transmission antennas, respectively, in operation S630. A beam generated through the multiple transmission antennas forms a virtual channel and is transmitted to the base station.

It is determined whether or not an ACK from the base station is received in operation S640.

If the ACK from the base station is received, the transmission mode of the mobile station changes from the RACH transmission mode to the packet data transmission mode, and the subband and beam forming pattern used for the transmission of the RACH of which the ACK is received are set to a successive user packet data in operation S650. The successive user packet data is OFDMA-modulated in the set subband, signal-processed with the set beam forming pattern, and then, transmitted in operation S650. The transmission power of the successive user packet data is calculated based on the power set to the RACH burst of which the ACK is received. Accordingly, the transmission power of the data may be equal to or different from the power set to the RACH burst of which the ACK is received.

Then, from the second data item, a predetermined resource is allocated according to the channel environment of a variety of types of users, and the requirement of a base station scheduler.

If the ACK from the base station is not received (if a NACK is received), it is determined whether or not a predetermined period has elapsed in operation S660.

If it is still within the predetermined period, operation 600 is performed again. At least one of the subband and the beam forming pattern is reset, and the RACH burst is signal-processed and transmitted again in operations 610 through 630.

If the ACK is not received during the predetermined period, a power higher than the previously set transmission power is set in operation S670. Then, operation 600 is performed again. At least one of the subband and the beam forming pattern is reset, and the RACH burst is signal-processed and transmitted again in operations 610 through 630.

This method is used to obtain a transmission diversity effect, by transmitting an RACH burst to a base station by using frequency hopping, beam forming, and power ramping, when a mobile station having two or more transmission antennas and two or more amplifiers in an uplink of an OFDMA-based or DFT-S OFDMA-based cellular system attempts random access.

Figure 7:
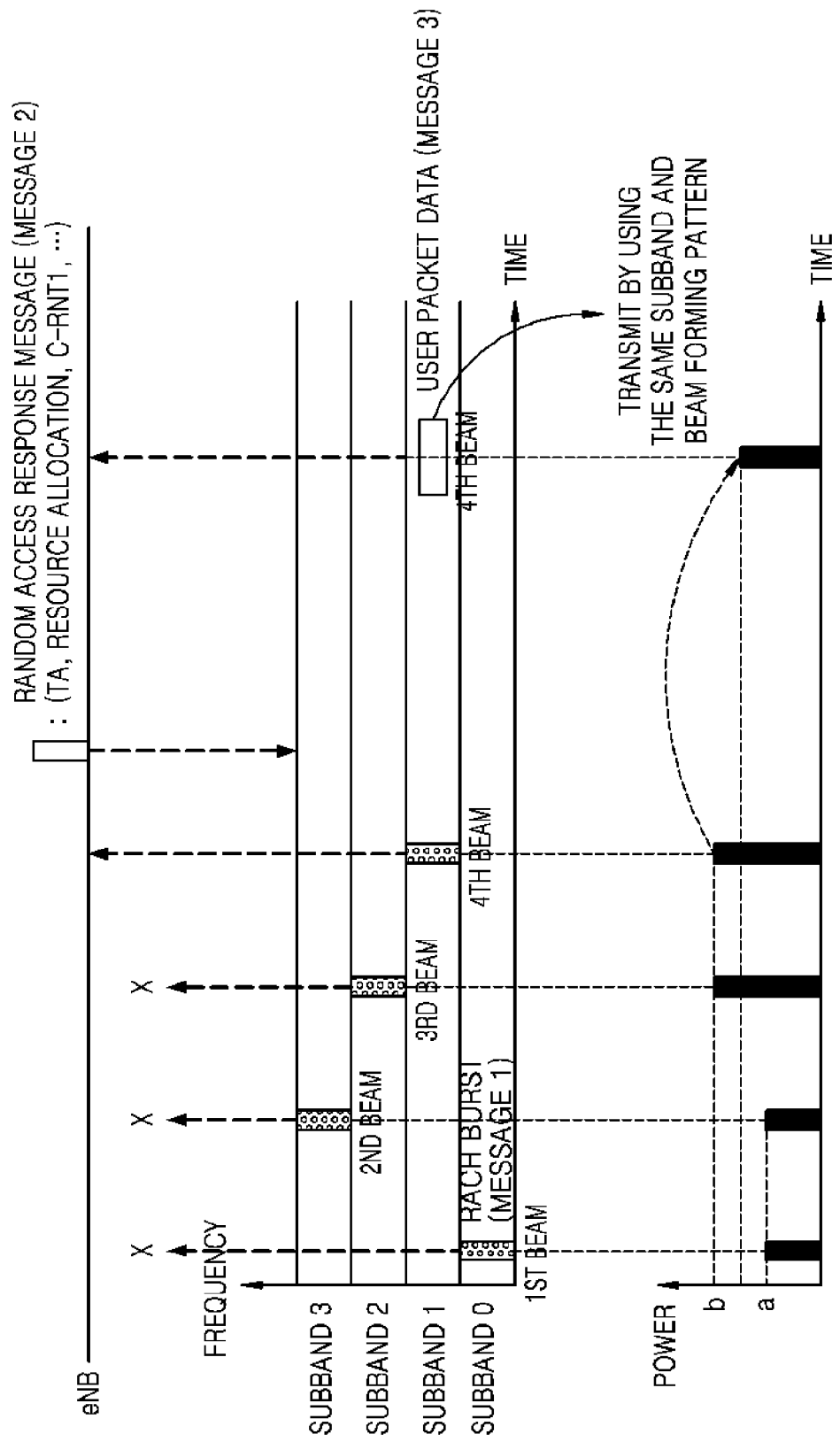
FIG. 7 is a diagram illustrating an example of a method of determining a transmission power of a successive user packet data in the transmission apparatus illustrated in FIG. 1 according to an embodiment of the present invention.

FIG. 7 is a diagram illustrating an example of a method of determining a transmission power of a successive user packet data in the embodiment illustrated in FIG. 1.

In FIG. 7, it is assumed that a signal-to-noise (SNR) value required for an RACH burst (message 1) to be successful is SNR1, and an SNR value required for a successive user packet data (message 3), which is transmitted after an ACK (message 2) from the base station is received, to be successful is SNR2. Also, it is assumed that the transmission power of the successful message 1 is power 1 and a transmission power to be used for transmission of the message 3 is power 2.

In this case, the SNR value of the random access preamble (message 1) varies according to the structure of the transmitted preamble, and the uplink (UL) message (message 3) also varies with respect to a modulation and coding scheme (MCS) and the size of preamble.

If the same frequency band (subband) and beam forming pattern as those of the message 1 which is the last successful preamble are used for the message 3, it is highly probable that the same channel environment can be maintained. Accordingly, the power 2 can be obtained by adding a margin to the difference between the two SNR values and multiplying by the power 1 as given by equation 1 below.

$$\text{Power 2} = \text{Power 1} * 10^{\{(SNR2-SNR1+\text{Delta\_SNR})/10\}} \quad (1)$$

Here, Delta_SNR is a marginal power considering channel changes according to the time difference between the preamble (message 1) and the message 3.

It can be clearly understood by a person skilled in the art of the present invention that the transmission power of the message 3 can be calculated in a variety of ways in addition to equation 1, according to a network environment and the preamble based on the transmission power (power 1) of the RACH burst of which the ACK is received.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A transmission method performed by a mobile station of obtaining random access diversity, the method comprising:
   (a) processing the signal of a random access channel (RACH) burst according to a beam forming pattern set from among a plurality of beam forming patterns, and then, transmitting the RACH burst to a base station with a first transmission power through multiple transmission antennas;
   (b) if a non-acknowledgement (NACK) response to the RACH burst from the base station is received, newly setting a beam forming pattern which is different from the set beam forming pattern, to a new RACH burst, and then, returning to the step (a); and
   (c) if an acknowledgement (ACK) response to the RACH burst is received from the base station, transmitting user packet data in response to the received ACK response using the same beam forming pattern set used to transmit the RACH burst,
   wherein the user packet data transmitted in response to the received ACK response is transmitted with a transmission power determined based on at least one of a structure of a preamble of the RACH burst, a modulation scheme, a coding scheme, and a size of preamble of the packet data, and
   wherein the transmission power is determined in the mobile station according to the first transmission power, first and second estimated signal-to-noise ratio values respectively required for the RACH burst and the user packet data to be received successfully, and a marginal power accounting for any changes in channel characteristics.

2. The method of claim 1, wherein the RACH burst is transmitted by using a subband that is different from a subband allocated to the previous RACH burst.

3. The method of claim 1, further comprising,
   (d) if a NACK from the base station is received while a predetermined time has elapsed, newly setting a transmission power higher than an previously set transmission power and returning to the step (a).

4. The method of claim 1, wherein in the step (c), a user packet data is transmitted by using a subband in which the RACH burst, of which the ACK is received, is transmitted.

5. The method of claim 1, wherein the step (a) comprises:
   (a1) generating the RACH burst signal, by performing orthogonal frequency division multiple access (OFDMA) modulation of the RACH burst so that the RACH burst can be loaded on a set subband; and
   (a2) processing the RACH burst signal according to the set beam forming pattern, and transmitting the RACH burst signal.

6. The method of claim 5, wherein the step (a2) comprises:
   processing the RACH burst signal, by applying a precoding matrix corresponding to the set beam forming pattern, to the RACH burst signal; and
   amplifying and up-converting each component of the processed RACH burst signal, and then, transmitting the component to a corresponding antenna from among the multiple transmission antennas.

7. The method of claim 1, wherein the RACH burst includes a signature sequence for identifying a mobile station which attempts random access.

8. The method of claim 1, wherein the RACH burst includes information on at least one of a user identifier and a resource request for setting up a call.

9. The method of claim 5, wherein the OFDMA modulation includes discrete Fourier transform-spread (DFT S) OFDMA modulation.

10. A non-transitory computer readable recording medium having embodied thereon a computer program for executing the method of claim 1.

11. A transmission method performed by a mobile station of obtaining random access diversity, the method comprising:
   (a) processing the signal of a random access channel (RACH) burst according to a beam forming pattern set from among a plurality of beam forming patterns, and then, transmitting the RACH burst to a base station with a first transmission power through multiple transmission antennas;
   (b) if a non-acknowledgement (NACK) response to the RACH burst from the base station is received, newly setting a beam forming pattern which is different from the set beam forming pattern, to a new RACH burst, and then, returning to the step (a); and
   (c) if an acknowledgement (ACK) response to the RACH burst is received from the base station, transmitting user packet data in response to the received ACK response using the same beam forming pattern set used to transmit the RACH burst,
   wherein the user packet data transmitted in response to the received ACK response is transmitted with a transmission power determined in the mobile station according to the first transmission power, and first and second estimated signal-to-noise ratio values respectively required for the RACH burst and the user packet data to be received successfully and a marginal power accounting for any changes in channel characteristics.

12. The method of claim 11, wherein the transmission power of the user packet data $P_2$ is determined based on the equation:

$$P_2 = P_1 * 10^{\{(SNR_2 - SNR_1 + \Delta SNR)/10\}}$$

where $P_1$ is the first transmission power, $SNR_1$ and $SNR_2$ respectively are the first and second signal-to-noise ratio values, and $\Delta SNR$ is a marginal power accounting for any changes in channel characteristics.

* * * * *